Figure 2:
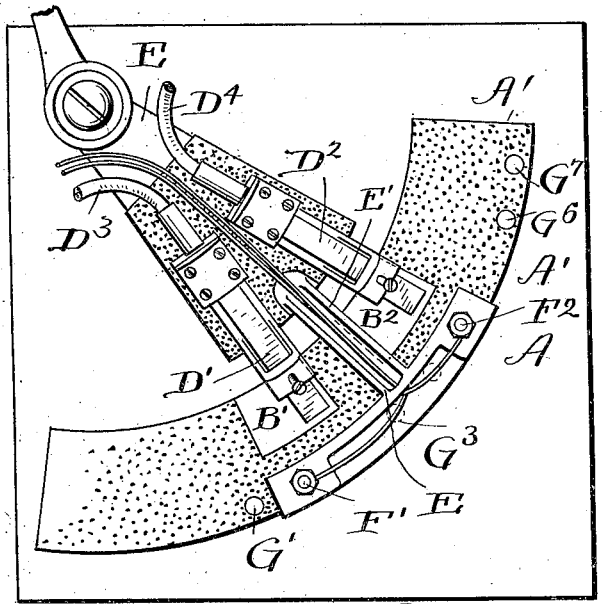

No. 850,475. PATENTED APR. 16, 1907.
J. H. HERTNER.
ELECTRIC MOTOR AND CONTROLLER FOR THE SAME.
APPLICATION FILED MAY 28, 1906.

3 SHEETS—SHEET 1.

Witnesses
E. B. Gilchrist
H. B. Sullivan

Inventor
John H. Hertner
by
Thurston Woodward
Attys

No. 850,475. PATENTED APR. 16, 1907.
J. H. HERTNER.
ELECTRIC MOTOR AND CONTROLLER FOR THE SAME.
APPLICATION FILED MAY 28, 1906.

3 SHEETS—SHEET 2.

No. 850,475. PATENTED APR. 16, 1907.
J. H. HERTNER.
ELECTRIC MOTOR AND CONTROLLER FOR THE SAME.
APPLICATION FILED MAY 28, 1906.

3 SHEETS—SHEET 3.

Witnesses
E. B. Gilchrist
H. B. Sullivan

Inventor
John H. Hertner
by
Thurston Woodward
attys

UNITED STATES PATENT OFFICE.

JOHN H. HERTNER, OF CLEVELAND, OHIO, ASSIGNOR OF ONE-HALF TO DE WITT COOKINGHAM, OF CLEVELAND, OHIO.

ELECTRIC MOTOR AND CONTROLLER FOR THE SAME.

No. 850,475.          Specification of Letters Patent.          Patented April 16, 1907.

Application filed May 28, 1906. Serial No. 319,031.

*To all whom it may concern:*

Be it known that I, JOHN H. HERTNER, a citizen of the United States, residing at Cleveland, in the county of Cuyahoga and State of Ohio, have invented a certain new and useful Improvement in Electric Motors and Controllers for the Same, of which the following is a full, clear, and exact description.

My invention relates to a system of control for electric motors.

More particularly my invention relates to the controlling of battery-driven electric motors in such manner that their speed may not only be regulated at will through the shifting of the batteries from parallel to tandem connection, and vice versa, but also may be automatically caused to cut down the speed when the load is increased and to increase the speed when the load is diminished.

It is of course of primary importance that in electric battery-driven vehicles the source of energy be utilized in such a way as to economize it in order to attain the maximum possible mileage and increase the radius of possible operation. It is a well-known fact that the storage batteries commonly employed in such vehicles retain only a certain amount of energy, and if this be expended rapidly the number of hours of operation is considerably lessened. Furthermore, the chemical character of the batteries is such that the total amount of energy liberated on a rapid discharge is less than that liberated at a normal rate. Thus if the vehicle is operated at a high rate of speed the energy necessary to carry it the given distance is greater than if the speed be moderate, and this fact applies as well if the road be muddy, rough, or otherwise unfavorable or if there are hills to climb. Another effect of rapid discharge is the falling of the electric pressure or voltage, which cuts down the efficiency of electric motors on a ratio far greater than the simple ratio of normal voltage or pressure. For these reasons I have endeavored to construct a motor which shall automatically decrease its speed when taking on an increase in load, as in climbing hills, and yet shall on an average smooth or level road maintain a higher rate of speed. In constructing such a motor attention should be given to the following facts: A shunt-wound motor is so constructed that it will maintain an approximately uniform speed regardless of the load which it is called upon to pull. This is accomplished by a field-winding of many turns of small-sized wire subject to the uniform voltage of the battery. A vehicle propelled by such a motor would tend to run at a constant speed up grades and over all obstructions, and if the speed on a level roadway were moderate the power consumption on a steep grade would be enormous. Its torque would increase in proportion to the increased current or load. On taking an up grade there would be a heavy discharge from the battery and the voltage would drop, owing to the inability of the chemical reaction to keep pace with the demand for energy. A series-wound motor, which has the field energized by the current that actually represents the load, would on taking a grade have its current immediately increased but the increased current would mean a more powerful field, more torque, and less speed. The increased torque and the slower speed would both demand a lower rate of delivery of the required energy, and hence a saving of the battery. Doubling the current on a given constant voltage would mean doubling the energy spent and approximately doubling the horse-power delivered. In a shunt-wound motor it would mean practically the same speed and double the torque, the speed multiplied by the torque being proportional to the horse-power. In a series-wound motor doubling the current would not quite double the field strength, and this not quite halves the speed, so that the torque would be somewhat less than four times its former value. This is the limit of the series-wound motor, and if a motor could be constructed to more than quadruple its torque on doubling its current we would have running conditions even better than before. Suppose in a certain series motor propelling a vehicle at a moderate speed on a level road a weak shunt-winding be inserted in opposition to the series winding. This would reduce the resulting field strength and increase the speed. When, however, a grade is reached, the series strength is greatly increased, and the opposing shunt being constant its effect in proportion to the series diminishes, and a point may be reached where it is inappreciable. From these conditions I have been able to construct a motor which shall automatically increase its torque and reduce its speed beyond the limits hitherto reached by any known type. Should I desire to climb a certain hill or carry a certain increase of load—for example, on about one-half the speed maintained before—I begin by doubling the number of series turns; but this would mean that our normal running speed on the level would also be reduced. I therefore introduce an amount of shunt to oppose the series, so that the desired speed on a level or normal road is maintained, and this shunt will, as above pointed out, become negligible when the load is increased and the series windings by consequence become much stronger.

Figure 1:
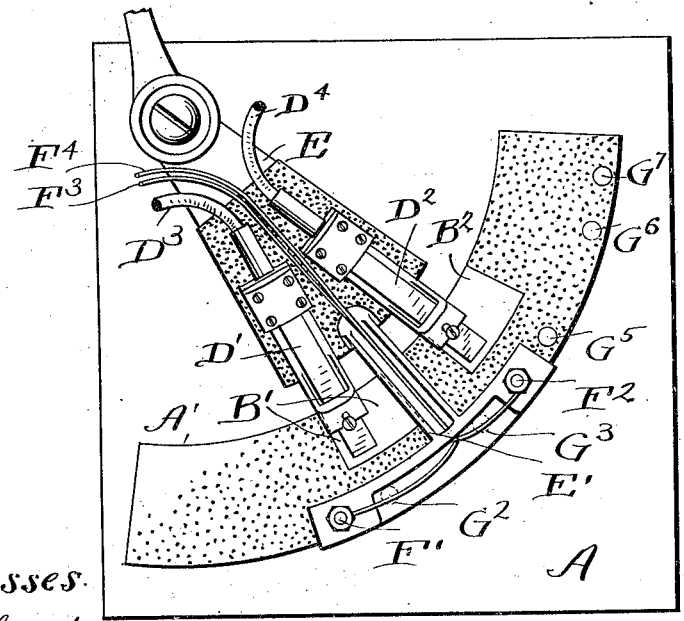
Figure 4:
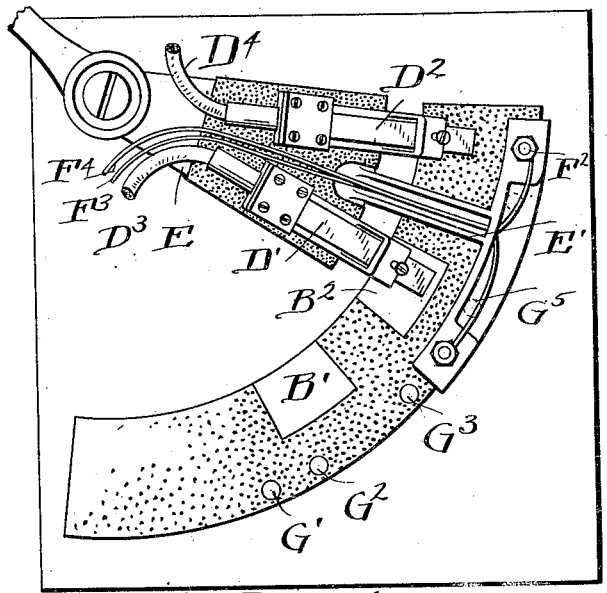
Figure 3:
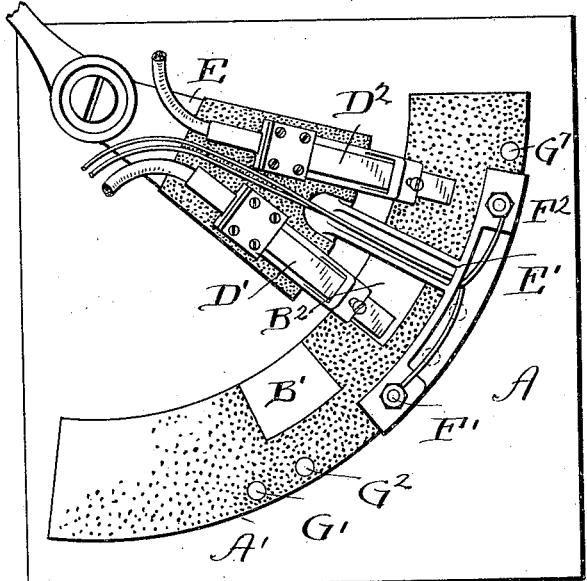
Figure 5:
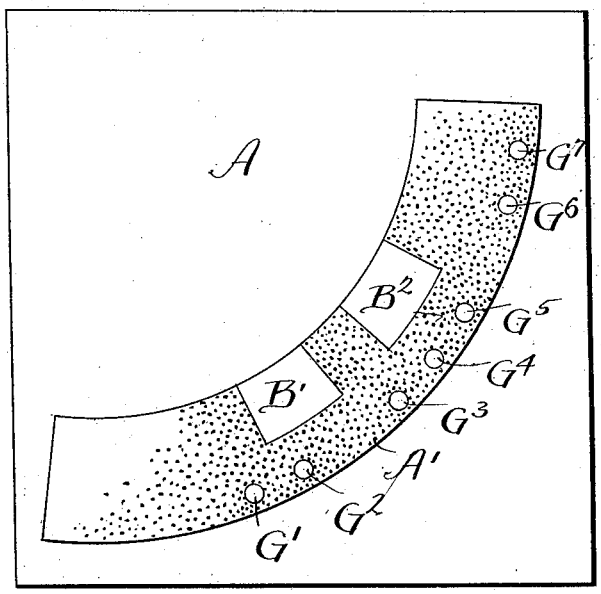
Figure 6:
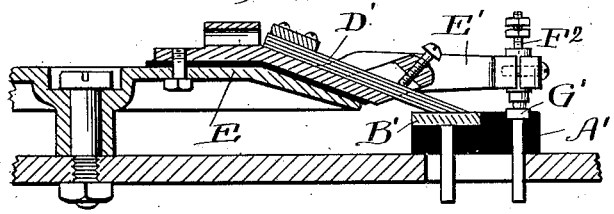
Figure 7:
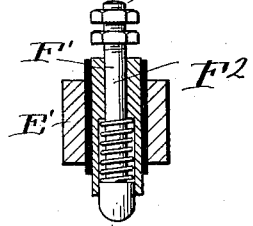
Figure 8:
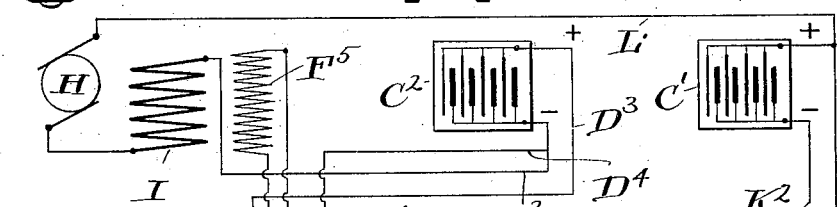

In the accompanying drawings, which illustrate an embodiment of my invention, Figure 1 is a plan of a controlling device for such a system as I have just described, showing the parts in such position that two groups of operating-batteries will be connected in parallel and the current passed through the shunt in a direction to assist the series winding and strengthen the field, thereby giving the motor its greatest torque and lowest speed. Fig. 2 is a plan of the controlling device shifted to a second position, in which the battery groups are still in parallel; but the shunt-current is opposed to the series current, so that the field strength is diminished and the speed of the motor is increased. Fig. 3 is a plan showing the controlling device shifted to a third position, where the battery groups are connected in tandem and the shunt-current directed so as to assist the series winding. Fig. 4 is a plan showing the controlling device shifted, so that the battery groups are connected in tandem, but the shunt-current directed in opposition to the series winding, so that the highest speed of the motor is attained. Fig. 5 is a plan view of the board on which the contact-strips and contact-buttons are secured. Fig. 6 is a section through the movable arm of the controlling device and the supporting-board, showing brush-and-pin contacts in engagement, respectively, with a contact strip and button. Fig. 7 is a detailed section showing the structure of the spring-pressed contact-pin which establishes the shunt connections. Fig. 8 is a diagram illustrative of the system of wiring and the connections by which the shunt-winding may be connected to assist or oppose the series winding and means whereby such connection may be made while the two groups of batteries are connected in parallel or in tandem.

It will be observed that the supporting-plate A has a strip of insulation A′, carrying two contact-strips B′ B², which are connected in any suitable manner with opposite poles of one battery group C′. For the purpose of making contact with these strips I have mounted two laminated brushes D′ D² of the usual type upon a swinging supporting-arm E, carrying insulation. The movement of this arm may be controlled in any desired manner, and any conventional spring-stops (not shown) may be employed to hold it in certain determined positions along the path of its movement. These brushes D′ D² are connected, respectively, through wires D³ D⁴ with opposite poles of the second battery group C², and it will be noted that the contact-strips B′ B² are of such width that the pivoted supporting-arm may be swung through an appreciable distance without breaking contact between the brushes and said strips. Carried by the same arm E is a projecting T-bracket E′, having at the outer extremities thereof a pair of spring-pressed contact-pins F′ F², adapted to ride over and contact with the series of contact-buttons G′ G² G³ G⁴ G⁵ G⁶ G⁷, placed in an arc on the insulating-strip A′, previously mentioned. These buttons are individually connected, by means of wires K′ K² with one or the other of the poles of one battery group, in the present instance, as seen by reference to Fig. 8, with that group C′ with which the contact-strips are connected. From the contact-pins F′ F² wires F³ F⁴ are led directly to the shunt-winding F⁵ for the motor H, and the direction of the current through this winding will obviously be determined by the battery connections of the particular contact-buttons with which said contact-pins happen to be in engagement at the time.

The motor is controlled by a series winding I, and these two elements are so connected that the current passes through them from a wire L′, connected with the same pole of the battery group C′, with which the wire K′ is connected, and is led away by a wire L², connected to the same pole of the battery group C² with which the wire D⁴ is connected.

It will be noted, by reference to Figs. 1, 2, 3, 4, and 8, that the contact-buttons G′ G² G³, &c., are so spaced apart that when the contact-brushes D′ D² are in engagement with the contact-strips B′ B² toward the extreme left of their movement, as seen in the figures referred to, the contact-pins F′ F² will be in engagement with buttons G′ G⁴, connected to the opposite poles of a battery group C′. By reference to the same figures it will be seen that when the contact-brushes D′ D² are shifted toward the right the shunt connections are first broken; but when the brushes are moved still farther, but stopped so that they each remain in engagement with a contact-strip the contact-pins each come into engagement with contact-buttons G² G⁵, having battery connections respectively the reverse of those of the buttons G′ G⁴. Thus in the second connection of the shunt with the battery the direction of current through the shunt-winding would be reversed. When the supporting-arm is shifted still farther to the right, so that the right-hand brush D² will pass entirely off of the strip B², with which it was previously in engagement, and the left-hand brush D' would pass from the first strip B' to engagement with the second strip B², then the contact-pins F' F², controlling the shunt-winding, will first break connection and then come into engagement with the contact-buttons G³ G⁶, respectively, having the same battery connections as the buttons G' G⁴, with which the pins F' F² were in engagement in the first or extreme left position. Upon the further shifting of the supporting-arm to the right, but still maintaining the left-hand contact-brush in engagement with the right-hand contact-strip, it will be seen that the contact-pins controlling the shunt-winding will first break connection with the battery and will then move into engagement with contact-buttons G⁴ G⁷, which have battery connections of reverse order to those of the buttons G³ G⁶ and of the same order as those of the buttons G² G⁵—that is to say, the direction of the current through the shunt will again be reversed.

Now it is to be noted on referring to Fig. 8 that in the first or extreme left position of the supporting-arm each of the contact-brushes is in full engagement with a contact-strip and the wiring is such that the two groups of batteries are connected in parallel, and this parallel connection is maintained in the next position, in which the shunt connections are reversed, since the contact-brushes each remain in engagement with their respective strips. In the position, however, in which the right-hand contact-brush D² moves off of its contact-strip B² and the left-hand brush D' moves thereon it is to be noted that the connection between the battery groups is shifted from parallel to tandem, and the current through the series winding would therefore be of double the voltage, and this same connection is maintained in the next position, in which the shunt connections are again reversed, since the left-hand brush is still engaged with the right-hand contact-strip. Thus it will be seen that I have connected the shunt in such manner that the current may be passed therethrough in either direction or cut out at will both while the current is constant in its direction through the series winding and while the battery groups are connected in either parallel or tandem.

In the position illustrated in Figs. 1 and 8 it will be seen that the current is taken from the battery groups which are connected in the parallel, thus giving the lowest voltage, and passed through the series and the shunt in the same direction—that is to say, so that the shunt assists the series in providing a strong field for the motor. This gives the motor its lowest speed and one which would not ordinarily be employed upon a level road for fair running. In the position illustrated in Fig. 2, with the battery groups still in parallel, the shunt is connected to oppose the series for the reasons that I have outlined in the introduction to the specification. This connection would give the motor a fair speed under a normal load and would be one at which the machine might be maintained for ordinary purposes. Should, however, an unusual load be thrown onto the machine, it will be noted, of course, that the strength of the series will be greatly increased by reason of the increased current, while the shunt-winding will remain at the same strength, since the voltage is constant and will therefore be of proportionately much less effect in opposing the series current. The motor will thereupon under the strengthened field slow down, and the torque will be increased.

In the position illustrated in Fig. 3 the same relations between the shunt and series current will be maintained as in Fig. 1, the difference being that the battery groups, being connected in tandem will supply the current at a higher voltage, and the speed will be increased, subject, of course, to diminution upon an increase in load.

In the position illustrated in Fig. 4 the same conditions obtain as in the position shown in Fig. 2 with the exception that the current is delivered at the higher voltage.

Thus it will be seen that I have devised a system of control for an electric motor whereby at any constant voltage the motor will automatically have its speed reduced and its torque increased upon an increase in load, and this without the speed of the motor under normal load being reduced. Further, the voltage of the motor-current may be increased by shifting the battery groups from parallel to tandem connection, and the automatic reduction of speed of the motor on increase in load may be obtained when the battery groups are connected in either parallel or tandem.

Many structural and operative advantages will be obvious to any one skilled in this art, and certain changes in the details of the structure may be made by those desiring to utilize the invention under particular conditions. I therefore do not restrict myself to details of structure, but desire to protect the invention in its broader aspects, as set forth in the foregoing specification and claims below.

Having thus described my invention, I claim—

1. In combination, an electric motor, the field of which is controlled by a series winding, a shunt-winding and connections therefor arranged to cause it to act in opposition to the series winding upon said field independently of fluctuations in the flow of current through the series winding.

2. In combination, an electric motor, the field of which is controlled by a series winding, a shunt-winding arranged to act in opposition to the series winding upon said field, and means for cutting the shunt-winding in or out while current is passing through the series winding.

3. In combination, an electric motor, the field of which is controlled by a series winding, a shunt-winding arranged to act upon the said field and means whereby current may be passed through the shunt-winding in either direction while the direction of the current through the series remains constant.

4. In combination, an electric motor, the field of which is controlled by a series winding, a shunt-winding arranged to act upon the said field, and means whereby current through the shunt-winding may be passed in either direction or cut out at will while the direction of the current through the series winding remains constant.

5. In combination, an electric motor, and two battery groups, one group having its positive and negative terminals connected respectively with a pair of contacts, the second group being likewise connected with a pair of contacts movable relatively to and adapted to engage with the first-mentioned pair, and connections between one brush of the motor and the positive pole of one of said battery groups and between the opposite brush and the negative pole of the other battery group.

6. In combination, an electric motor and two battery groups, one battery group having its positive and negative terminals connected respectively with a pair of contacts, the second battery group being likewise connected with a pair of contacts movable relatively to and adapted to engage with the first-mentioned pair, the arrangement of the parts being such that when the two pairs of contacts are in engagement, the terminals having the same sign shall be connected, and connections between one brush of the motor and the positive pole of one of said battery groups and between the opposite brush and the negative pole of the other battery group.

7. In combination, an electric motor, and two battery groups, one group having its positive and negative terminals connected respectively with a pair of contacts, the second group being likewise connected with a pair of contacts movable relatively to and adapted to engage with the first-mentioned pair, the arrangement of parts being such that when but one of each pair of contacts is in engagement a terminal of one group is connected with a terminal of opposite sign in the second group, and connections between one brush of the motor and the positive pole of one of said battery groups and between the opposite brush and the negative pole of the other battery group.

In testimony whereof I hereunto affix my signature in the presence of two witnesses.

JOHN H. HERTNER.

Witnesses:
J. B. WOODWARD,
E. B. GILCHRIST.